US007775059B2

(12) United States Patent
Suzuki

(10) Patent No.: US 7,775,059 B2
(45) Date of Patent: Aug. 17, 2010

(54) AIR CONDITIONER

(75) Inventor: Kenichi Suzuki, Kiryu (JP)

(73) Assignee: Sanden Corporation, Isesaki-shi, Gunma (JP)

( * ) Notice: Subject to any disclaimer, the term of this patent is extended or adjusted under 35 U.S.C. 154(b) by 1015 days.

(21) Appl. No.: 10/598,037

(22) PCT Filed: Feb. 4, 2005

(86) PCT No.: PCT/JP2005/001664

§ 371 (c)(1),
(2), (4) Date: Aug. 16, 2006

(87) PCT Pub. No.: WO2005/078362

PCT Pub. Date: Aug. 25, 2005

(65) Prior Publication Data

US 2008/0223053 A1      Sep. 18, 2008

(30) Foreign Application Priority Data

Feb. 16, 2004    (JP)    ............... 2004-038611

(51) Int. Cl.
*F25B 1/00* (2006.01)
*F25B 49/00* (2006.01)

(52) U.S. Cl. .................. 62/228.5; 62/228.4; 62/236; 62/244

(58) Field of Classification Search ............... 62/228.1, 62/228.4, 228.5, 244, 236, 175, 510
See application file for complete search history.

(56) References Cited

U.S. PATENT DOCUMENTS 5,027,608 A * 7/1991 Rentmeester et al. ......... 62/115

FOREIGN PATENT DOCUMENTS

| JP | 2002234337 A | 8/2002 |
| JP | 2003211953 A | 7/2003 |
| JP | 2003211954 A | 7/2003 |
| JP | 2003291633 A * | 10/2003 |

OTHER PUBLICATIONS

International Bureau of WIPO, Translation of International Preliminary Report on Patentability mailed Sep. 28, 2006 for related International Application No. PCT/JP2005/001664.

* cited by examiner

*Primary Examiner*—Chen-Wen Jiang
(74) *Attorney, Agent, or Firm*—Baker Botts L.L.P.

(57) ABSTRACT

An air conditioner includes a fixed displacement-type first compression mechanism and a variable displacement-type second compression mechanism independent from each other in a refrigeration cycle, and further includes second compression mechanism displacement control means, compression mechanism operation switching control means, an evaporator for refrigerant, a condenser, a blower, evaporator temperature detection means, and evaporator target temperature calculation means. When the refrigeration cycle is operated only by the first compression mechanism, referring to a temperature (Teva) detected by the evaporator temperature detection means, a temperature (Toff) calculated by the evaporator target temperature calculation means and a predetermined value A, if a condition of Teva−Toff≧A is satisfied, both compression mechanisms are operated simultaneously. The condition of required cooling ability is properly determined, an optimum control for air conditioning is realized, and the loss of consumption power and the like can be adequately suppressed.

6 Claims, 6 Drawing Sheets

AIR CONDITIONER

TECHNICAL FIELD OF THE INVENTION

The present invention relates to an air conditioner with a refrigeration cycle having a compressor for refrigerant, and more specifically, to an air conditioner suitable for controlling a refrigeration cycle having a fixed displacement compression mechanism and a variable displacement compression mechanism independent from each other.

BACKGROUND ART OF THE INVENTION

In conventional air conditioners, for example, in air conditioners for work vehicles, there is a structure in which a compressor of a refrigeration cycle is operated by an engine to form an air conditioner. Further, in a case where a room space of a work vehicle (for example, a space in a cabin) is large, or in a case where a thermal load varies greatly, there is a case where a plurality of compressors are used for a single refrigeration cycle and drive force transmission systems are provided for respective compressors. Furthermore, there is an air conditioner wherein, in a refrigeration cycle having two compressors, one is a fixed displacement-type compressor and the other is a variable displacement-type compressor (for example, Patent document 1).

In a case where two compressors are used, however, there is a problem that there is no means for properly determining a required cooling ability, or even if there is, if a proper determination is not carried out, the required cooling ability cannot be achieved, and further, a comfortable feeling of passengers cannot be obtained. Further, if the determination of excessive cooling ability is carried out properly, the loss of consumption power and the like may become great.

Patent document 1: JP-A-2003-19908

DISCLOSURE OF THE INVENTION

Problems to be Solved by the Invention

Accordingly, an object of the present invention is to provide an air conditioner capable of properly carrying out the determination of a required cooling ability, realizing an optimum air conditioning control and adequately suppressing the loss of consumption power and the like, for an air conditioner having two compression mechanisms wherein one is a fixed displacement-type compression mechanism and the other is a variable displacement-type compression mechanism capable of being changed in displacement, for example, an air conditioner suitable as one for a cabin of a work vehicle.

Means for Solving the Problems

To achieve the above-described object, an air conditioner according to the present invention comprises a fixed displacement-type first compression mechanism and a variable displacement-type second compression mechanism independent from each other in a refrigeration cycle, and further comprises second compression mechanism displacement control means for controlling a displacement of the second compression mechanism, compression mechanism operation switching control means for switching to an operation by the two compression mechanisms or a sole operation by any one compression mechanism, an evaporator for refrigerant for cooling air for air conditioning, a condenser for refrigerant, a blower for sending air to the evaporator, evaporator temperature detection means for detecting a temperature of the evaporator or a temperature of air at an exit of the evaporator (Teva), and evaporator target temperature calculation means for calculating a target temperature (Toff) of the evaporator temperature or the evaporator exit air temperature, and wherein, when the refrigeration cycle is operated only by the first compression mechanism, a temperature (Teva) detected by the evaporator temperature detection means, a temperature (Toff) calculated by the evaporator target temperature calculation means and a predetermined value A are referred, and if a condition of Teva−Toff$\geq$A is satisfied, the first compression mechanism and the second compression mechanism are operated simultaneously.

In such an air conditioner, a structure may be employed wherein, when the condition of Teva−Toff$\geq$A is satisfied and an additional condition is satisfied in which a period of time from a time at that the condition is satisfied to a time at that the first compression mechanism is coupled to its power source is a predetermined time B or more, the first compression mechanism and the second compression mechanism are operated simultaneously.

Further, in this air conditioner, a structure may be employed wherein the air conditioner further comprises room interior temperature detection means for detecting a temperature in an objective room for air conditioning (Tin) and room interior temperature setting means for setting a room interior target temperature (Tset), and wherein, a temperature (Tin) detected by the room interior temperature detection means, a temperature (Tset) set by the room interior temperature setting means and a predetermined value C are referred, and when the condition of Teva−Toff$\geq$A is satisfied, the additional condition is satisfied in which the period of time from a time at that the condition is satisfied to a time at that the first compression mechanism is coupled to its power source is the predetermined time B or more, and another additional condition of Tin−Tset$\geq$C is satisfied, the first compression mechanism and the second compression mechanism are operated simultaneously.

Further, in such an air conditioner, a structure may also be employed wherein the Teva, the Toff and a predetermined value D greater than the predetermined value A are referred, and if a condition of Teva−Toff$\geq$D is satisfied, the first compression mechanism and the second compression mechanism are operated simultaneously, in spite of the above-described additional condition. Namely, when this condition is satisfied, the simultaneous operation is carried out unconditionally.

Further, a structure may also be employed wherein the Teva, the Toff, the Tin, the Tset and a predetermined value E greater than the predetermined value C are referred, and if a condition of Tin−Tset$\geq$E is satisfied, the first compression mechanism and the second compression mechanism are operated simultaneously, in spite of the above-described additional conditions. Namely, also when this condition is satisfied, the simultaneous operation is carried out unconditionally.

Further, in the air conditioner according to the present invention, a structure may be employed wherein, when the refrigeration cycle is operated by the first and second compression mechanisms, the Teva, the Toff, a predetermined value F and a predetermined time G are referred, and when a condition where a time having satisfied a condition of Teva−Toff$\geq$F is G or more is satisfied, only the first compression mechanism is operated. Namely, the switching from the simultaneous operation to the operation of only the first compression mechanism may be controlled in such a manner.

Further, a structure may also be employed wherein a temperature in an objective room for air conditioning (Tin), a room interior target temperature (Tset) and a predetermined value H are further referred, and when any one condition of the condition where a time having satisfied said condition of Teva−Toff≧F is G or more, a condition of Tin−Tset≧H, and a condition where the displacement of the second compression mechanism is a predetermined value I or less, is satisfied, only the first compression mechanism is operated.

Further, a structure may also be employed wherein a predetermined time J is further referred, and when any one condition of the condition where a time having satisfied the condition of Teva−Toff≧F is G or more, a condition where a time having satisfied the condition of Tin−Tset≧H is J or more, and the condition where the displacement of the second compression mechanism is the predetermined value I or less, is satisfied, only the first compression mechanism is operated.

The air conditioner according to the present invention, performing such a control for switching to the simultaneous operation of the first and second compression mechanisms and further a control for switching from the simultaneous operation to the sole operation of only the first compression mechanism, is suitable as an air conditioner for vehicles, especially, as an air conditioner for work vehicles.

Effect According to the Invention

In the air conditioner according to the present invention, in the air conditioner having a plurality of (first and second) compression mechanisms in a refrigeration cycle, because the required cooling ability is accurately determined in condition and both compression mechanisms are operated simultaneously, it is possible to control an optimum operation condition in accordance with the required cooling ability. Further, because it is also possible to adequately determine excess and lack of the cooling ability and to control switching to the simultaneous operation or to a sole operation, a frequent switching of operation may be avoided and the consumption power may be saved.

EXPLANATION OF SYMBOLS

Figure 1:
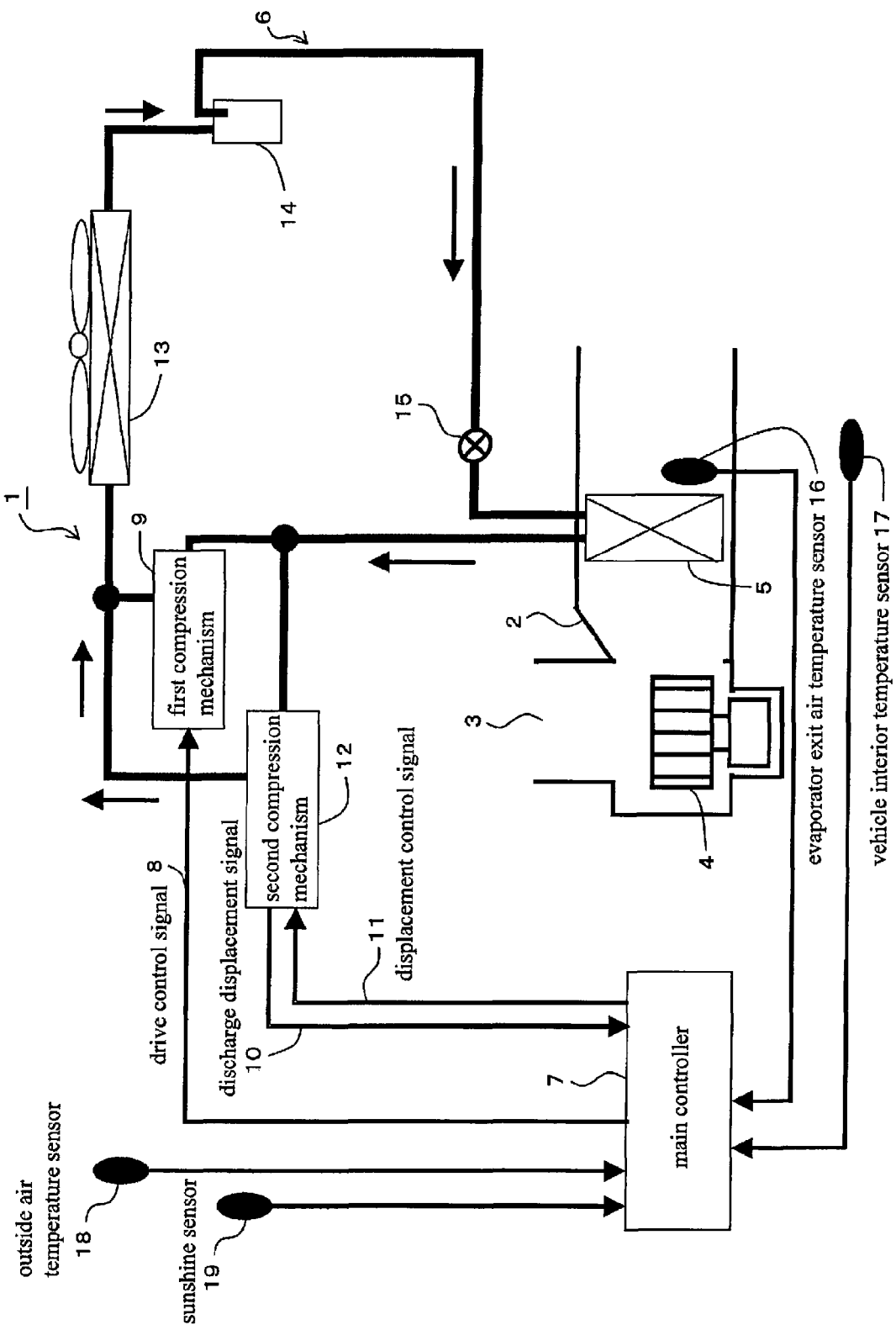
FIG. 1 is a schematic equipment disposition diagram of an air conditioner according to an embodiment of the present invention.

1: air conditioner
2: air duct
3: introduction port for outside air or/and inside air
4: blower
5: evaporator
6: refrigeration cycle
7: main controller
8: drive control signal
9: first compression mechanism
10: discharge displacement signal
11: displacement control signal
12: second compression mechanism
13: condenser
14: liquid receiver
15: expansion valve
16: evaporator exit air temperature sensor
17: vehicle interior temperature sensor
18: outside air temperature sensor
19: sunshine sensor

THE BEST MODE FOR CARRYING OUT THE INVENTION

Hereinafter, desirable embodiments of the present invention will be explained referring to figures.

FIG. 1 shows a schematic equipment disposition diagram of an air conditioner according to an embodiment of the present invention, for example, an air conditioner for work vehicles. In air conditioner 1 depicted in FIG. 1, a blower 4 for sending air sucked through an introduction port 3 for outside air or/and inside air is provided at an upstream position in an air duct 2 opening toward a room interior (for example, the interior of a cabin). An evaporator 5 is provided at a position downstream blower 4 as a cooler for cooling air sent. Although not shown in the figure, as needed, a heater core as a heater may be provided downstream evaporator 5. The air having passed through evaporator 5 and having been cooled is blown into the room interior.

A refrigeration cycle 6 with evaporator 5 is provided in the above-described air conditioner 1. Refrigeration cycle 6 is constructed as a refrigerant circuit in which respective equipment are connected via refrigerant tubes, and in this refrigeration cycle 6, provided are a fixed displacement-type first compression mechanism 9 whose drive source is a prime mover (for example, an engine), etc. and whose drive is controlled by a drive control signal 8 sent from a main controller 7, and a variable displacement-type second compression mechanism 12 whose discharge displacement signal 10 is sent to main controller 7 and whose displacement is controlled by a displacement control signal 11 sent from main controller 7. In this embodiment, second compression mechanism 12 is driven by an electric motor. In refrigeration cycle 6, a condenser 13 for condensing high-temperature and high-pressure refrigerant compressed by first compression mechanism 9 and/or second compression mechanism 12, a liquid receiver 14 for separating the condensed refrigerant into gas and liquid phases, an expansion valve 15 for reducing in pressure and expanding the refrigerant sent from liquid receiver 14, and evaporator 5 for evaporating the refrigerant sent from expansion valve 15 and cooling the air sent in air duct 2 by heat exchange between the refrigerant and the air, are disposed in this order, and the refrigerant from evaporator 5 is sucked into the above-described compression mechanism and compressed again. The temperature control of evaporator 5 is carried out, for example, by the control of a clutch provided on a drive force transmitting route from the prime mover to the first compression mechanism 9 and a control signal for the electric motor for driving the second compression mechanism 12.

In this embodiment, to main controller 7, sent is a signal of an evaporator exit air temperature (Teva) detected by an evaporator exit air temperature sensor 16 provided as evaporator temperature detection means for detecting a temperature of an evaporator or a temperature of air at an exit of the evaporator (Teva). Further, signals from vehicle interior temperature sensor 17, outside air temperature sensor 18 and sunshine sensor 19 are also sent to main controller 7, respectively.

In this embodiment, the control is carried out as shown in FIGS. 2 to 6.

When operated by any one of first compression mechanism 9 and second compression mechanism 12, the control of the evaporator temperature is carried out by a target temperature of the evaporator exit air temperature calculated by the evaporator target temperature calculation means, and when switched to the simultaneous operation of first compression mechanism 9 and second compression mechanism 12, the conditions and the control are shown as follows.

Figure 2:
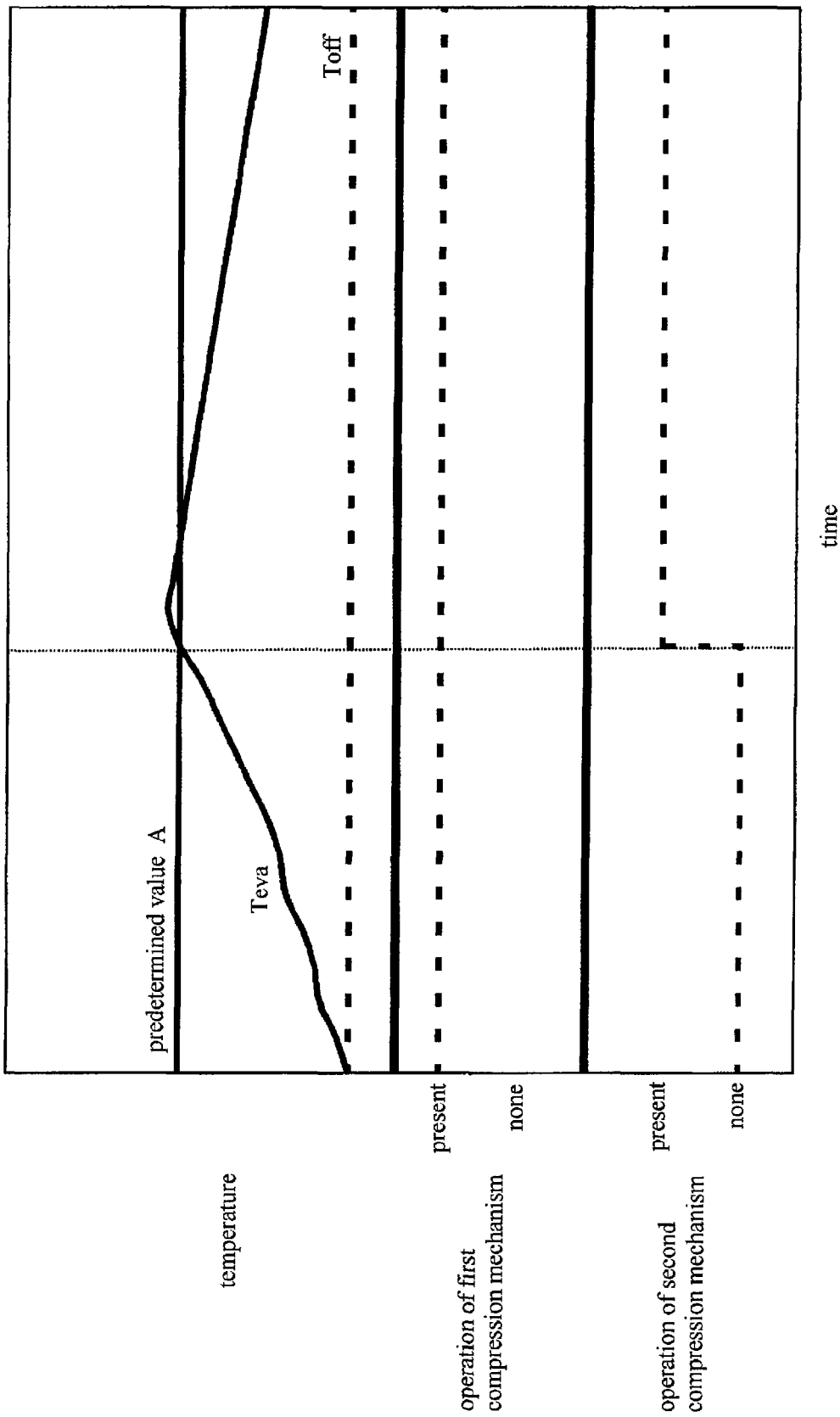
FIG. 2 is a time chart showing an example of the control of the air conditioner depicted in FIG. 1.

First, in the control depicted in FIG. 2, when refrigeration cycle 6 is operated only by first compression mechanism 9, a temperature (Teva) detected by evaporator exit air temperature sensor 16 provided as the evaporator temperature detection means, a temperature (Toff) calculated by the evaporator target temperature calculation means and a predetermined value A are referred, and if a condition of Teva−Toff≧A is satisfied, the operation is switched so that first compression mechanism 9 and second compression mechanism 12 are operated simultaneously. Namely, in a case where a difference between the detected temperature (Teva) and the calculation target temperature (Toff) becomes the predetermined value A or more and it is determined that the condition of the simultaneous operation to be carried out is satisfied, the operation is switched from the sole operation performed only by first compression mechanism 9 to the simultaneous operation performed by first compression mechanism 9 and second compression mechanism 12. Because second compression mechanism 12 is a variable displacement-type compression mechanism, the discharge displacement of the second compression mechanism 12 in accordance with a thermal load is added to the discharge displacement of first compression mechanism 9, and as a whole, an optimum operation of refrigeration cycle 6 in accordance with the thermal load at that time becomes possible, and as the result of this simultaneous operation, the operation is adequately controlled so that the Teva approaches the Toff.

Figure 3:
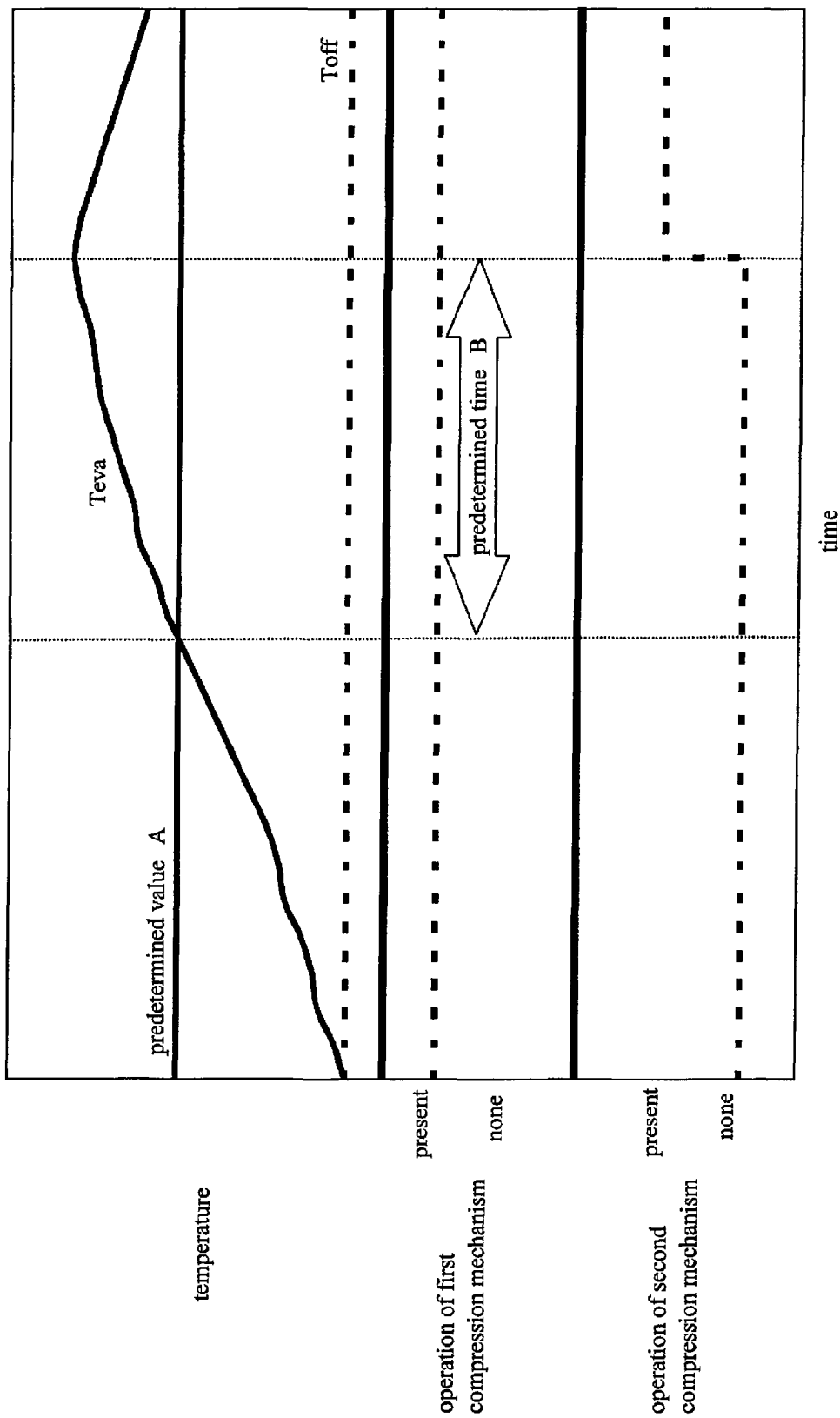
FIG. 3 is a time chart showing another example of the control of the air conditioner depicted in FIG. 1.

Further, in the control depicted in FIG. 3, in addition to the above-described control, further, when the condition of Teva−Toff≧A is satisfied and an additional condition is satisfied in which a period of time from a time at that the condition is satisfied to a time at that first compression mechanism 9 is coupled to its power source is a predetermined time B or more, first compression mechanism 9 and second compression mechanism 12 are operated simultaneously. By setting this predetermined time B, unnecessary frequent switching may be avoided, and the consumption power may be saved.

Further, although not shown in a figure, in this air conditioner, a structure may also be employed wherein the air conditioner further comprises room interior temperature detection means (vehicle interior temperature sensor 17) for detecting a temperature in an objective room for air conditioning (Tin) and room interior temperature setting means (room interior temperature setting means to main controller 7) for setting a room interior target temperature (Tset), and wherein a temperature (Tin) detected by the room interior temperature detection means, a temperature (Tset) set by the room interior temperature setting means and a predetermined value C are referred, and when the condition of Teva−Toff≧A is satisfied, the additional condition is satisfied in which the period of time from a time at that the condition is satisfied to a time at that the first compression mechanism is coupled to its power source is the predetermined time B or more, and another additional condition of Tin−Tset≧C is satisfied, first compression mechanism 9 and second compression mechanism 12 are operated simultaneously. Also by setting such a predetermined time C, unnecessary frequent switching may be avoided, and the consumption power may be saved.

Where, in the above-described control, a structure may be employed wherein the Teva, the Toff and a predetermined value D greater than the above-described predetermined value A are referred, and if a condition of Teva−Toff≧D is satisfied, first compression mechanism 9 and second compression mechanism 12 are operated simultaneously, in spite of the above-described additional condition. Namely, in a case where Teva−Toff≧D is satisfied, if the simultaneous operation is not carried out, it is determined that a lack of cooling ability occurs inevitably, and therefore, if this condition is satisfied, the simultaneous operation is carried out unconditionally.

Further, a structure may also be employed wherein the above-described Teva, the Toff, the Tin, the Tset and a predetermined value E greater than the above-described predetermined value C are referred, and if a condition of Tin−Tset≧E is satisfied, first compression mechanism 9 and second compression mechanism 12 are operated simultaneously, in spite of the above-described additional conditions. In a case where a difference of the predetermined value E or more occurs between the actual room interior temperature Tin and the set temperature Tset, it is determined that a lack of cooling ability is occurring actually, and therefore, also if this condition is satisfied, the simultaneous operation is carried out unconditionally.

Figure 4:
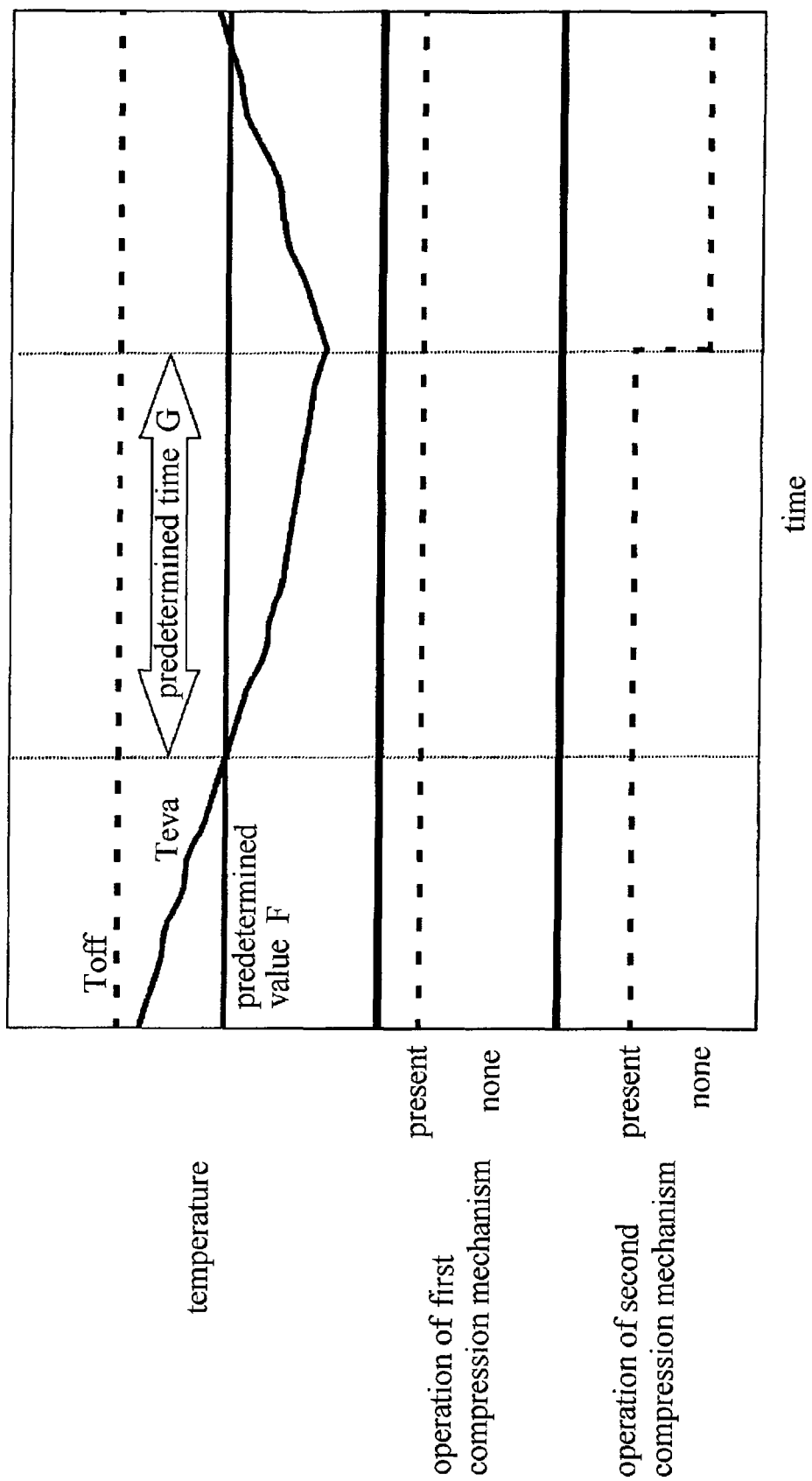
FIG. 4 is a time chart showing a further example of control of the air conditioner depicted in FIG. 1.

Further, in the air conditioner according to the present invention, the condition and the control for switching the operation from the simultaneous operation to a sole operation, particularly, to the sole operation only by the first compression mechanism, can be specified. For example, as shown in FIG. 4, a structure may be employed wherein, when refrigeration cycle 6 is operated by the simultaneous operation of first compression mechanism 9 and second compression mechanism 12, the above-described Teva, the Toff, a predetermined value F and a predetermined time G are referred, and when a condition where a time having satisfied a condition of Teva−Toff≦F is G or more is satisfied, only first compression mechanism 9 is operated. Namely, in a case where the simultaneous operation becomes unnecessary, the operation is switched to the sole operation of first compression mechanism 9, and when that condition is continued for the predetermined time G or more, it is determined that the simultaneous operation surely becomes unnecessary, and while frequent switching is avoided, the consumption power may be saved.

Figure 5:
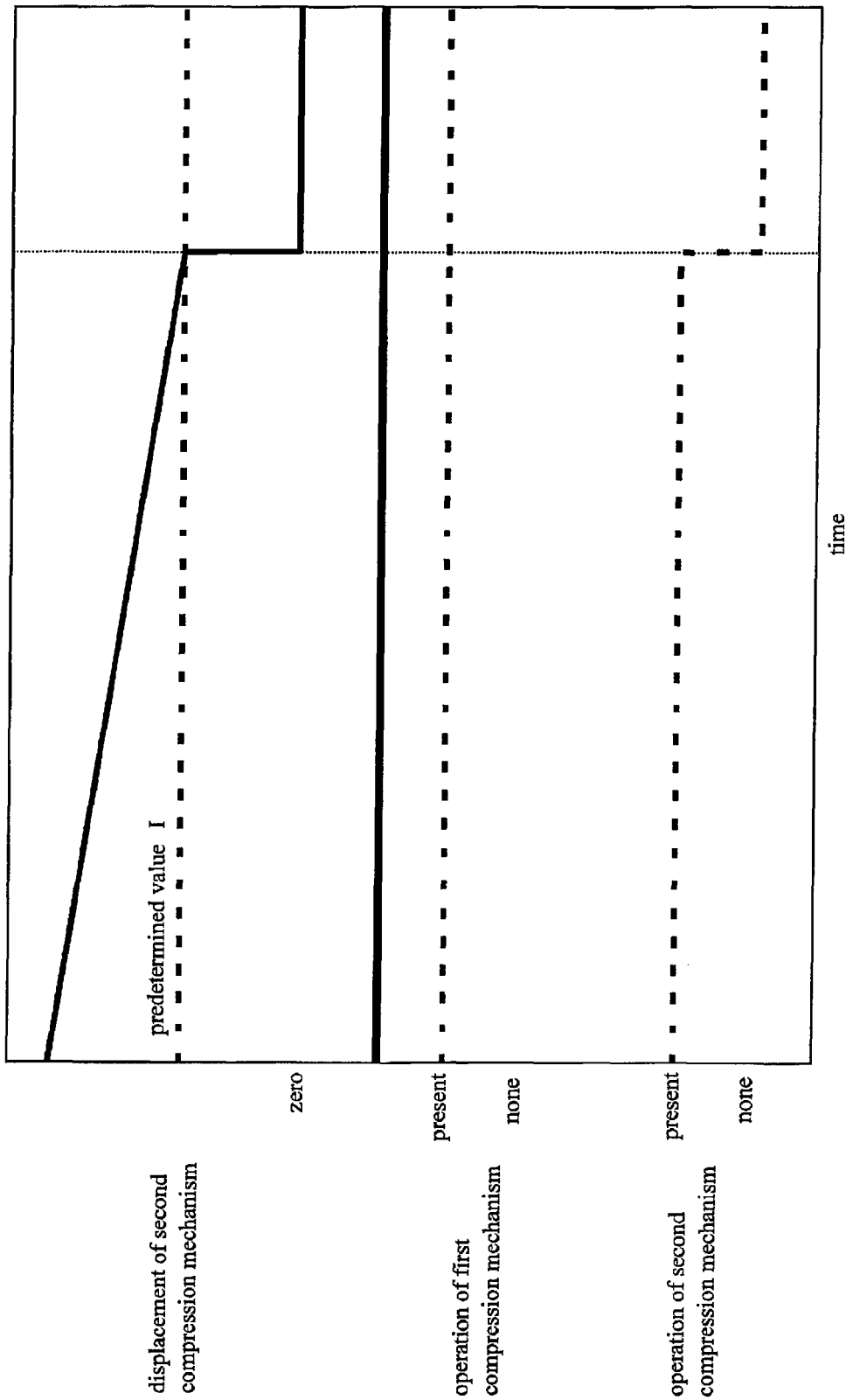
FIG. 5 is a time chart showing a still further example of control of the air conditioner depicted in FIG. 1.

Further, a structure may also be employed wherein the above-described Tin, the above-described Tset and a predetermined value H are further referred, and when any one condition of the condition where a time having satisfied the condition of Teva−Toff≦F is G or more, a condition of Tin−Tset≧H, and a condition where the displacement of second compression mechanism 12 is a predetermined value I or less, is satisfied, only first compression mechanism 9 is operated. For example, as shown in FIG. 5, among the above-described conditions, if the displacement of second compression mechanism 12 becomes the predetermined value I or less, the operation of second compression mechanism 12 is stopped and the operation is performed only by first compression mechanism 9. Also by such a control, while frequent switching is avoided, the consumption power may be saved.

Figure 6:
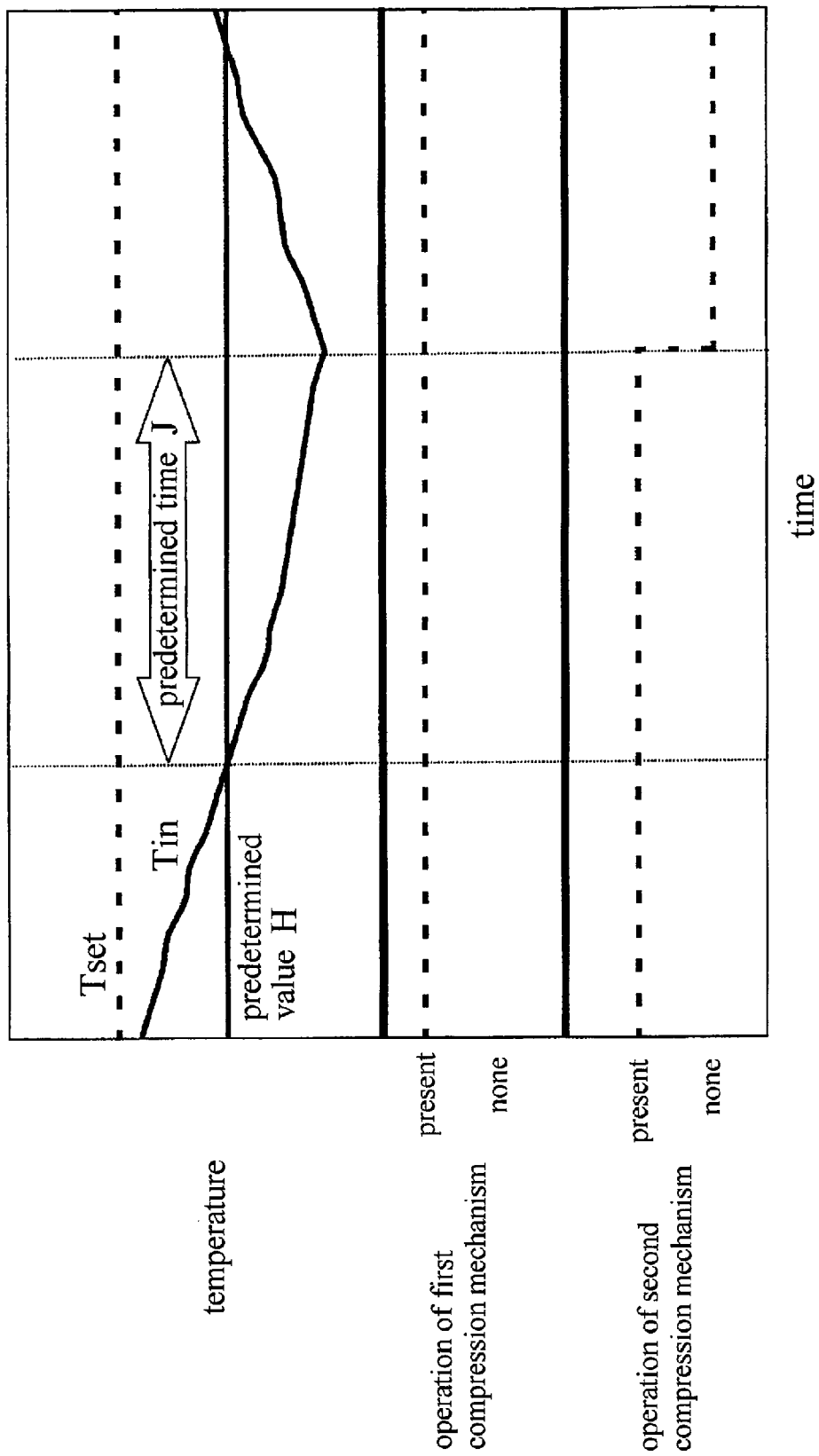
FIG. 6 is a time chart showing a still further example of control of the air conditioner depicted in FIG. 1.

Further, a structure may also be employed wherein a predetermined time J is further referred, and when any one condition of the condition where a time having satisfied the condition of Teva−Toff≧F is G or more, a condition where a time having satisfied the condition of Tin−Tset≧H is J or more, and the condition where the displacement of second compression mechanism 12 is the predetermined value I or less, is satisfied, only first compression mechanism 9 is operated. For example, as shown in FIG. 6, among the above-described conditions, if the time having satisfied the condition of Tin−Tset H becomes J or more, the operation of second compression mechanism 12 is stopped and the operation is performed only by first compression mechanism 9. Also by such a control, while frequent switching is avoided, the consumption power may be saved.

By the above-described control, in the air conditioner having a plurality of compression mechanisms in a refrigeration cycle, a required cooling ability is accurately determined in condition and the simultaneous operation of both compression mechanisms can be controlled, and it is possible to control an optimum operation condition in accordance with the required cooling ability. Further, because excess and lack of the cooling ability is properly determined, frequent switching to the simultaneous operation or to a sole operation can be avoided, and it becomes possible to save the consumption power.

INDUSTRIAL APPLICATIONS OF THE INVENTION

The air conditioner according to the present invention can be suitably applied to any refrigeration cycle having a fixed displacement compression mechanism and a variable displacement compression mechanism independent from each other, and in particular, it is suitable as an air conditioner for a cabin of a work vehicle violent in variation of thermal load.

The invention claimed is:

1. An air conditioner comprising a fixed displacement-type first compression mechanism and a variable displacement-type second compression mechanism independent from each other in a refrigeration cycle, and further comprising second compression mechanism displacement control means for controlling a displacement of said second compression mechanism, compression mechanism operation switching control means for switching to an operation by said two compression mechanisms or a sole operation by any one compression mechanism, an evaporator for refrigerant for cooling air for air conditioning, a condenser for refrigerant, a blower for sending air to said evaporator, evaporator temperature detection means for detecting a temperature of said evaporator or a temperature of air at an exit of said evaporator (Teva), and evaporator target temperature calculation means for calculating a target temperature (Toff) of said evaporator temperature or said evaporator exit air temperature, wherein, when said refrigeration cycle is operated only by said first compression mechanism, a temperature (Teva) detected by said evaporator temperature detection means, a temperature (Toff) calculated by said evaporator target temperature calculation means and a predetermined value A are referred, and if a condition of Teva−Toff≧A is satisfied, said first compression mechanism and said second compression mechanism are operated simultaneously, wherein, when said refrigeration cycle is operated by said first and second compression mechanisms, said Teva, said Toff, a temperature in an objective room for air conditioning (Tin), a room interior target temperature (Tset), a predetermined value F, a predetermined time G, and a predetermined value H are referred, and when any one condition of said condition where a time having satisfied said condition of Teva−Toff≧F is G or more, a condition of Tin−Tset≧H, and a condition where said displacement of said second compression mechanism is a predetermined value I or less, is satisfied, only said first compression mechanism is operated.

2. The air conditioner according to claim 1, wherein, when said condition of Teva−Toff≧A is satisfied and an additional condition is satisfied in which a period of time from a time at that said condition is satisfied to a time at that said first compression mechanism is coupled to its power source is a predetermined time B or more, said first compression mechanism and said second compression mechanism are operated simultaneously.

3. The air conditioner according to claim 2 further comprising room interior temperature detection means for detecting the temperature in an objective room for air conditioning (Tin) and room interior temperature setting means for setting the room interior target temperature (Tset), wherein the temperature (Tin) detected by said room interior temperature detection means, the temperature (Tset) set by said room interior temperature setting means and a predetermined value C are referred, and when said condition of Teva−Toff≧A is satisfied, said additional condition is satisfied in which said period of time from a time at that said condition is satisfied to a time at that said first compression mechanism is coupled to its power source is said predetermined time B or more, and another additional condition of Tin−Tset≧C is satisfied, said first compression mechanism and said second compression mechanism are operated simultaneously.

4. The air conditioner according to claim 3, wherein said Teva, said Toff, said Tin, said Tset and a predetermined value E greater than said predetermined value C are referred, and if a condition of Tin−Tset≧E is satisfied, said first compression mechanism and said second compression mechanism are operated simultaneously.

5. The air conditioner according to claim 2, wherein said Teva, said Toff and a predetermined value D greater than said predetermined value A are referred, and if a condition of Teva−Toff≧D is satisfied, said first compression mechanism and said second compression mechanism are operated simultaneously.

6. The air conditioner according to claim 1, wherein a predetermined time J is further referred, and when any one condition of said condition where a time having satisfied said condition of Teva−Toff≧F is G or more, a condition where a time having satisfied said condition of Tin−Tset≧H is J or more, and said condition where said displacement of said second compression mechanism is said predetermined value I or less, is satisfied, only said first compression mechanism is operated.

* * * * *